Jan. 20, 1959    C. L. DAY ET AL    2,870,016
METHOD AND APPARATUS FOR PREPARING BEVERAGES
Filed Nov. 12, 1954    3 Sheets-Sheet 1

INVENTORS
Carl L. Day, Frederick E. Fauth
and Wilmer D. Regnier
BY Cushman, Darby & Cushman
ATTORNEYS

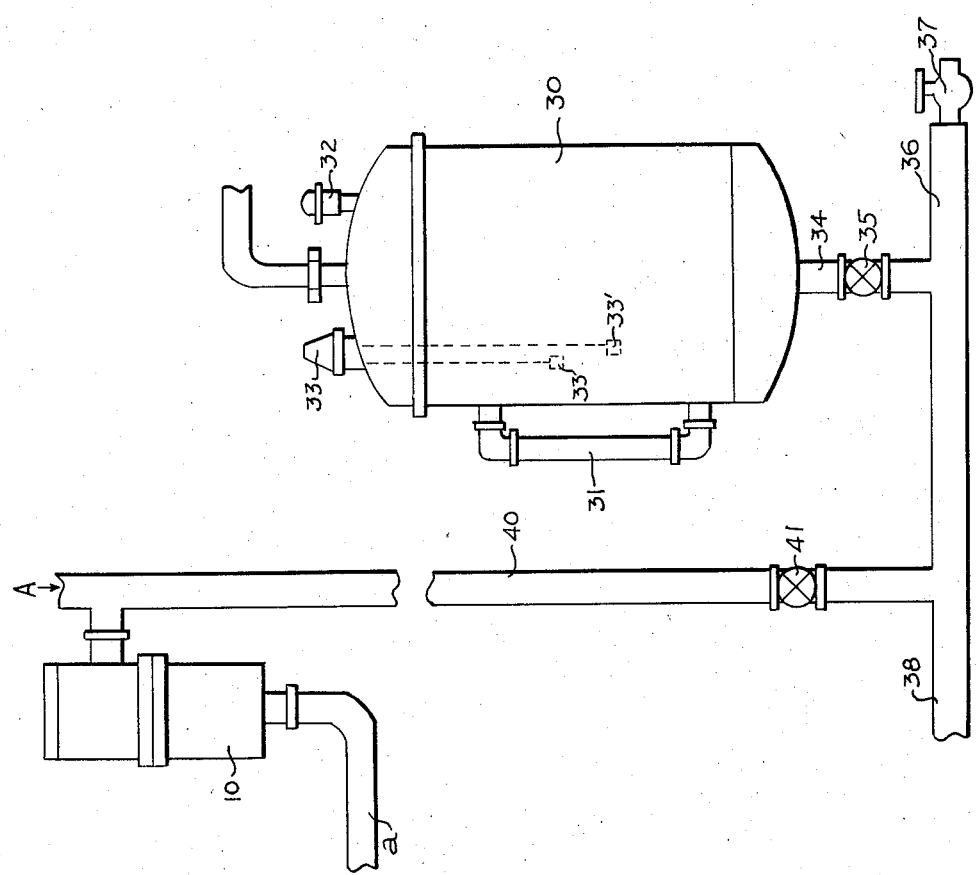

2,870,016

METHOD AND APPARATUS FOR PREPARING BEVERAGES

Carl L. Day, Frederick E. Fauth, and Wilmer D. Regnier, Baltimore, Md., assignors to Crown Cork & Seal Company, Inc., Baltimore, Md., a corporation of New York Application November 12, 1954, Serial No. 468,416

10 Claims. (Cl. 99—79)

This invention relates to a method and apparatus for preparing a carbonated water-syrup mixture for filling into bottles as by the conventional filler to produce, for example, the various popular "soft drinks," as well as other products.

The primary object of this invention is to mix the syrup and uncarbonated water at normal temperatures in suitable proportions and then flow such mixture over cooling plates to a collection trough or reservoir. The mixing, cooling and collection of the mixture in the reservoir takes place in a closed chamber in an atmosphere of carbon dioxide which is introduced at a point adjacent to but above the liquid level and under a pressure insufficient to bubble through the mixture in the reservoir.

From the collecting tank or reservoir, the cool mixture containing a small amount of absorbed carbon dioxide is introduced to the usual carbonator or saturator and then to the bottle filler and capper.

Figure 1:
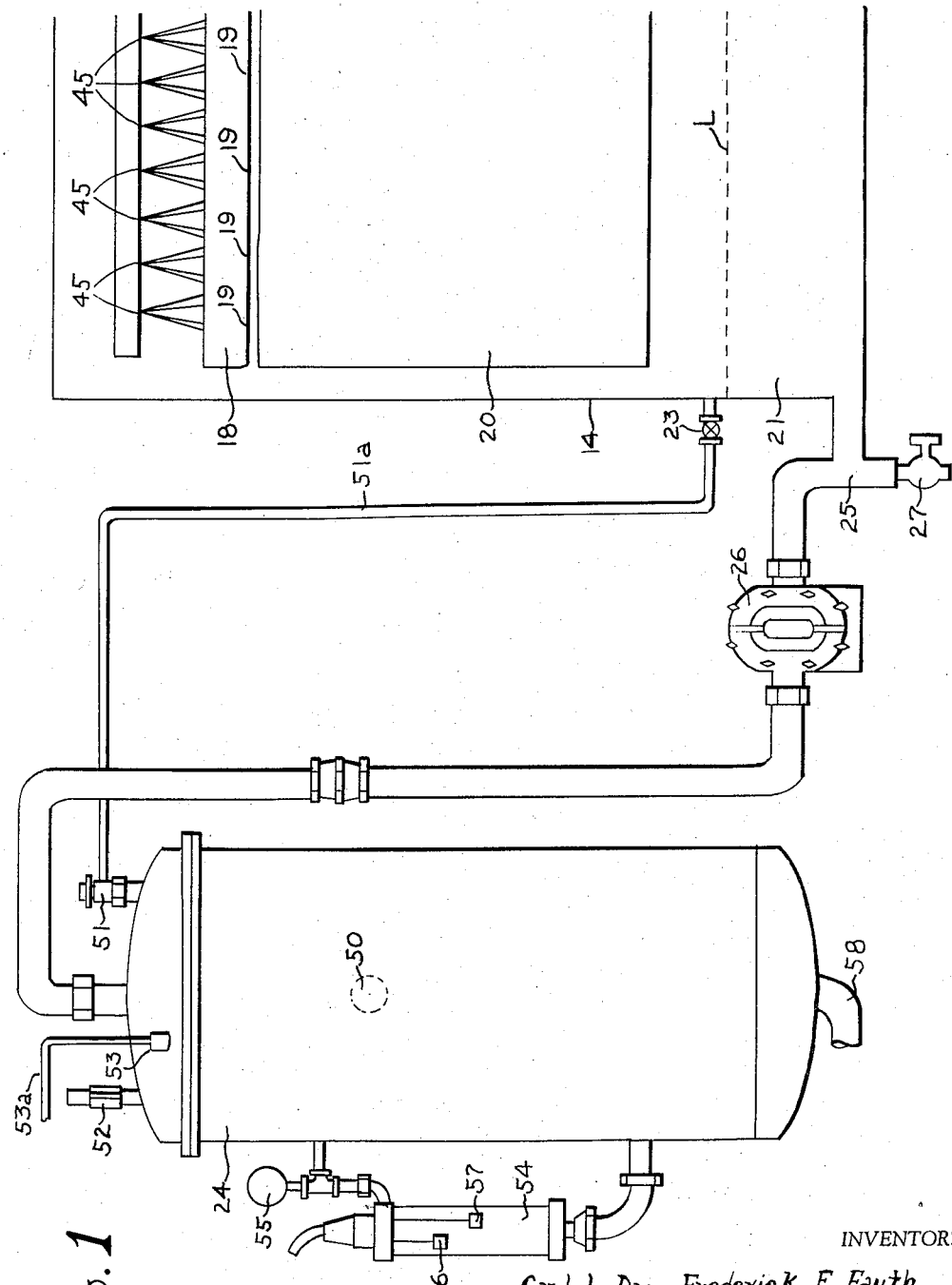
Figure 2:
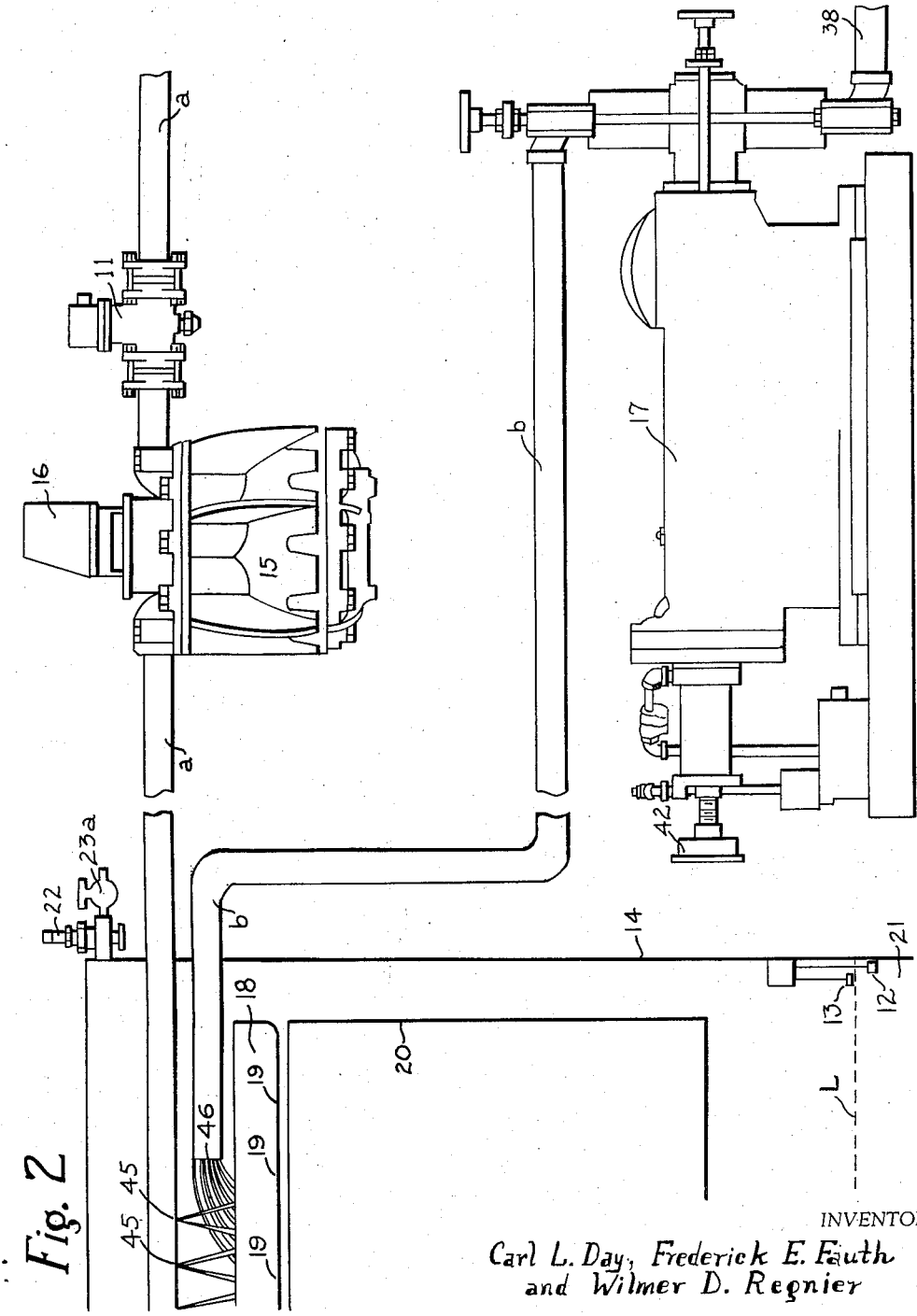

Figures 1, 2 and 3, when placed in order from left to right and with their short edges abutting, comprise a diagrammatic view of apparatus which may be used in carrying out the invention.

The letter A indicates the water inlet from a source of filtered water at normal temperature. The water which is usually under line pressure from a suitable head, although it may be pumped as desired, flows through a conventional flow rate valve device 10 which constitutes a capacity control to keep water flow constant and smooth and at a desired flow rate regardless of how severely pressures within the system may fluctuate. From the valve 10, the water passes a well-known type of solenoid shut-off valve 11, which is controlled by the beverage level electric probes 12—13 in the reservoir or collecting tank of the cooler 14. The water then passes through a meter 15 of which many types are commercially available having the usual transmitting device 16 connected to the vertical drive shaft of the meter to pick up and transmit an electrical impulse to a commercial type of four-way solenoid valve on the conventional syrup pump 17. In this manner, the proper proportions of water and syrup delivered to the cooler are simply, accurately and uniformly automatically controlled, i. e., and to illustrate, every time five gallons of water passes the meter 15 and is delievered to the cooler 14 through the line $a$, one gallon of syrup is pumped to the cooler through the line $b$.

The cooler 14 is a closed chamber to avoid loss of heat and avoid contamination of the water-syrup mixture, the interior being readily accessible for thorough cleaning. At its upper or top portion there is provided a beverage distributing trough 18 which extends longitudinally of the cooler, as shown. The trough 18 is perforated at spaced points, e. g., provided with lines of perforations 19 to allow liquid to drip downwardly upon one or more cooling plates 20 which are vertically suspended in the cooler 14 below the trough 18 and above the liquid level in the reservoir or collecting portion 21. The plates 20 are of conventional design, and a refrigerant is circulated through passages or coils in the same so as to form plates having a serpentine cooling surface over which the mixture gravitates and flows down from the trough 18 to the reservoir portion 21.

The cooler 14 has at the top a safety pressure relief valve 22, and a manual snift valve 23$a$. Also, at the bottom there is provided the probes 12—13, the lower probe 12 of which opens the solenoid shut-off valve 11 when the level in the reservoir is below it, and the upper probe 13 of which shuts off this valve when the level rises to it.

The inlet 23 in the cooler 14 for the carbon dioxide is disposed, as shown, a short distance above the level L of the mixture in the reservoir. The carbon dioxide is introduced under a low pressure from the carbonator or other source, and is under a low pressure in the cooler 14, e. g., not more than 3 to 5 pounds. This produces a carbon dioxide atmosphere in the cooler without having the carbon dioxide bubble through the liquid. Some of the gas will, of course, be absorbed into the cool liquid mixture to produce a slight pre-carbonation of the mixture prior to active carbonation in the saturator 24. The pre-carbonated mixture cooled to 34°, or slightly thereabove, is delivered from the reservoir through a conduit 25 to the sanitary saturator pump 26 delivering to the saturator, there being a drain and sampling valve 27 in the line 25, as shown.

The syrup is supplied to the chamber 30 usually by pump 17, or in any suitable manner, the tank 30 or chamber having a sight glass 31, a breather filter 32 in the top as shown, suitable electric probes 33—33' to cause a syrup supply pump, not shown, to be operated in accordance with the syrup level in the tank 30 to maintain the level at proper level in relation to the probes. A syrup outlet 34 is provided including a shut-off valve 35. The outlet 34 has an extension or branch 36 terminating in a syrup drain and sampling valve 37, and a branch 38 leading to the syrup pump 17 which is actuated by a double acting pneumatic cylinder which is controlled by a Hunt electrical four-way solenoid valve, the pump construction being commercially available and known as a Milton Roy "Aroymetric" pump.

The line 40 from the water supply conduit 38 inlet A has a shut-off valve 41 which, when opened, allows the syrup lines to be flushed out with cleaning water from inlet A.

The pump 17 has a stroke indicator 42, it being the function of this pump to control the amount of syrup delivered and the period of time of delivery of syrup. The capacity of the pump is variable from 0 to 100% of maximum capacity by dial adjustment (as shown by the indicator 42) of the pump plunger stroke length which can be accomplished while the system is operating. As above stated, operation of the meter will intermittently actuate the pump to deliver a predetermined amount of syrup for each predetermined amount of water passing through the meter. Thus, continuous delivery or intermittent delivery of syrup and water or continuous delivery of one, e. g., water, and intermittent delivery of the other, e. g., syrup, to the trough 18 of the cooler, as shown, may be accomplished.

The water line or pipe $a$ terminates in perforations 45 or suitable spray devices and the syrup line $b$ terminates in a nozzle 46. In this manner, the filtered water and syrup at room or plant temperature are simultaneously intimately contacted with each other while being introduced to the trough 18 of the cooler and are agitated while collecting in this trough, so as to produce an intimate mixture of the two. As this mixture discharges from the trough the perforations 19 in the bottom of the same, it gravitates over the refrigerated plates 20 and the cold mixture collects in the reservoir or collecting portion 21 of the cooler 14. After the mixture has become cooled sufficiently, it has the usual affinity for the carbon dioxide present in the atmosphere of the cooler above the liquid level L and some carbon dioxide will be thus absorbed to effect a mild pre-carbonation.

The snift valve 23a at the top of cooler 14 will be slightly open to permit a continual bleed to atmosphere of any carbon dioxide gas and any air in the cooler.

The pre-carbonated mixture from the pump 26 is delivered to the top of the carbonator 24 and within the carbonator the liquid is completely carbonated or saturated with carbon dioxide introduced through the inlet 50 under pressure, the pressure in the carbonator 24 being relatively high, namely, of the order of 90 pounds.

The carbonator 24 has the usual valve 51 in its top which is connected by a conduit 51a with the gas inlet valve 23 of the cooler 14 to supply the precarbonating carbon dioxide. The carbonator saturator 24 also has the customary pressure relief valve 52 and a spud 53 connected to a line such as 53a which supplies carbon dioxide gas to the top of the filler reservoir, as is customary. Also, the carbonator has the sight glass 54 and pressure gauge 55. Within the glass 54 are disposed the electric probes 56—57 for controlling the operation of the saturator pump 26 and the liquid level of the beverage within the carbonator 24.

The carbonator has the usual outlet 58 for carrying carbonated beverage to the filler in the usual manner.

By reason of the construction and the method described herein, preliminary deaeration or cooling of the syrup and uncarbonated water prior to mixing is avoided and it is possible to operate rapidly and uniformly at all times.

Preferably, the syrup pump 17 is disposed below the trough 18 of the cooler 14 so that syrup is only supplied intermittently in timed relation and proportioned amount, and will not leak into the trough objectionably.

As will be appreciated, the mixture in the reservoir portion 21 is partially carbonated and the complete carbonation, of course, will take place in the saturator or carbonator 24. Also, it will be observed that the uncarbonated water and syrup are initially supplied to the trough 18 and mixed therein at normal or plant temperature.

Referring to Figure 1 it will be noted that the inlet 23 for introducing carbon dioxide into the cooler 14 is disposed above the liquid level L in the reservoir and below the lower adjacent ends of the cooling plates 20, i. e., between the liquid level and the lower ends of the plates.

We claim:

1. The method of preparing a beverage mixture of carbonated water and syrup suitable for filling into containers comprising the steps of: mixing syrup and uncarbonated water at normal temperature in an atmosphere of carbon dioxide at low pressure above atmospheric pressure, cooling the mixture of syrup and water in the atmosphere of carbon dioxide at low pressure so as to precarbonate the mixture, and then subjecting the pre-carbonated mixture to an atmosphere of carbon dioxide at high pressure for completion of the carbonation of the mixture.

2. A method of the character described in claim 1, wherein the low pressure atomsphere of carbon dioxide is in the order of 4 p. s. i.

3. A method according to claim 2, wherein the high pressure atmosphere of carbon dioxide is in the order of 90 p. s. i.

4. A method of preparing a beverage mixture of carbonated water and syrup suitable for filling into containers comprising the steps of: mixing a predetermined metered amount of syrup at normal temperature with a predetermined metered amount of uncarbonated water at normal temperature in an atmosphere of carbon dioxide at low pressure above atmospheric pressure, cooling the mixture by filming over a cooling surface while still in the presence of the atmosphere of carbon dioxide at low pressure so as to precarbonate the mixture, collecting the precarbonated mixture and subjecting the same to an atmosphere of carbon dioxide at high pressure for complete carbonation of the mixture, and delivering the carbonated mixture to containers.

5. A method according to claim 4, wherein the low pressure atmosphere of carbon dioxide is in the order of 4 p. s. i.

6. A method according to claim 4, wherein the high pressure atmosphere of carbon dioxide is in the order of 90 p. s. i.

7. An apparatus of the class described comprising a cooler in the form of a closed chamber, a trough in the upper end of said cooler, means for supplying uncarbonated water and syrup individually to said trough and mixing the same initially therein, vertical cooling plates in said cooler, said trough having means for discharging the mixture downwardly over said plates to cool the same, a reservoir in the lower end of said cooler for collecting the cooled mixture, means for actuating the supply means according to the level in said reservoir, and means for introducing carbon dioxide to said cooler above or adjacent the liquid level in said reservoir.

8. An apparatus according to claim 7 wherein the syrup supply means is located below the said trough externally of the cooler and includes means for pumping syrup to said trough.

9. An apparatus according to claim 8 wherein a meter is provided for the uncarbonated water supplied to said trough, and means operable from said meter to actuate the syrup supply pump.

10. An apparatus according to claim 7 wherein the means for introducing carbon dioxide to said cooler is disposed above the liquid level in the reservoir and below the lower adjacent ends of the vertical cooling plates.

References Cited in the file of this patent

UNITED STATES PATENTS

| | | |
|---|---|---|
| 1,243,068 | Humphrey | Oct. 16, 1917 |
| 1,373,817 | Humphrey | Apr. 5, 1921 |
| 2,455,681 | Kantor et al. | Dec. 7, 1948 |